US011938751B2

(12) United States Patent
Vermeulen

(10) Patent No.: US 11,938,751 B2
(45) Date of Patent: Mar. 26, 2024

(54) METHOD FOR MANUFACTURING A FLOOR BOARD

(71) Applicant: FLOORING INDUSTRIES LIMITED, SARL, Bertrange (LU)

(72) Inventor: Bruno Vermeulen, Aldeneik-Maaseik (BE)

(73) Assignee: FLOORING INDUSTIES LIMITED, SARL, Bertrange (LU)

( * ) Notice: Subject to any disclaimer, the term of this patent is extended or adjusted under 35 U.S.C. 154(b) by 0 days.

(21) Appl. No.: 18/121,276

(22) Filed: Mar. 14, 2023

(65) Prior Publication Data

US 2023/0211629 A1 Jul. 6, 2023

Related U.S. Application Data

(63) Continuation of application No. 17/678,838, filed on Feb. 23, 2022, which is a continuation of application (Continued)

(30) Foreign Application Priority Data

Mar. 5, 2010 (EP) .................................... 10155673

(51) Int. Cl.
*B05D 3/12* (2006.01)
*B05D 1/28* (2006.01)
(Continued)

(52) U.S. Cl.
CPC ................ *B44C 1/227* (2013.01); *B05D 1/28* (2013.01); *B05D 3/067* (2013.01); *B05D 3/12* (2013.01);
(Continued)

(58) Field of Classification Search
None
See application file for complete search history.

(56) References Cited

U.S. PATENT DOCUMENTS 3,083,116 A 3/1963 Berndt
3,440,076 A 4/1969 Vaurio
(Continued)

FOREIGN PATENT DOCUMENTS

CA 1204968 A 5/1986
CN 1503739 A 6/2004
(Continued)

OTHER PUBLICATIONS

"Digital," Definition by Merriam-Webster, 2015, pp. 1-5, retrieved Aug. 6, 2015 from http://www.merriam-webster.com/dictionary/digital.
(Continued)

*Primary Examiner* — Alexander M Weddle
(74) *Attorney, Agent, or Firm* — Workman Nydegger

(57) ABSTRACT

A method of manufacturing a floor board comprises the steps of supplying a panel, printing a curable substance or surface removing substance onto the panel in a predefined pattern for creating an elevation on the panel at the pattern or removing a portion of the surface of the panel at the pattern, respectively, and curing the curable substance or removing any reaction products of the surface removing substance and the panel.

17 Claims, 1 Drawing Sheet

Related U.S. Application Data

No. 16/356,750, filed on Mar. 18, 2019, now Pat. No. 11,292,289, which is a continuation of application No. 14/678,653, filed on Apr. 3, 2015, now Pat. No. 10,239,346, which is a continuation of application No. 13/581,738, filed as application No. PCT/EP2011/053383 on Mar. 7, 2011, now abandoned.

(51) Int. Cl.

| | |
|---|---|
| ***B05D 3/06*** | (2006.01) |
| ***B05D 5/02*** | (2006.01) |
| ***B05D 7/00*** | (2006.01) |
| ***B41F 17/24*** | (2006.01) |
| ***B44C 1/20*** | (2006.01) |
| ***B44C 1/22*** | (2006.01) |
| ***B44C 5/04*** | (2006.01) |
| ***B44F 9/02*** | (2006.01) |

(52) U.S. Cl.

CPC ............... *B05D 5/02* (2013.01); *B05D 7/542* (2013.01); *B41F 17/24* (2013.01); *B44C 1/20* (2013.01); *B44C 5/0476* (2013.01); *B44F 9/02* (2013.01)

(56) References Cited

U.S. PATENT DOCUMENTS

| | | | |
|---|---|---|---|
| 3,446,184 | A | 5/1969 | Johnson |
| 3,545,997 | A | 12/1970 | Hochberg |
| 3,648,358 | A | 3/1972 | Cannady et al. |
| 3,963,338 | A | 6/1976 | Altman |
| 3,968,288 | A * | 7/1976 | Trexler .................... B05D 3/12 427/198 |
| 4,227,200 | A | 10/1980 | Mansukhani |
| 4,267,209 | A | 5/1981 | Hanson |
| 4,312,268 | A | 1/1982 | King et al. |
| 4,348,447 | A | 9/1982 | Miller, Jr. et al. |
| 4,504,523 | A | 3/1985 | Miller et al. |
| 4,684,548 | A | 8/1987 | Chretien |
| 4,689,259 | A | 8/1987 | Miller et al. |
| 4,796,402 | A | 1/1989 | Pajala |
| 4,833,530 | A | 5/1989 | Kohashi |
| 4,880,689 | A | 11/1989 | Park et al. |
| 4,943,816 | A | 7/1990 | Sporer |
| 5,204,055 | A | 4/1993 | Sachs et al. |
| 5,498,466 | A | 3/1996 | Navarro et al. |
| 5,565,246 | A | 10/1996 | Hyde |
| 5,594,484 | A | 1/1997 | Furukawa |
| 5,627,578 | A | 5/1997 | Weintraub |
| 5,778,789 | A | 7/1998 | Krishnan et al. |
| 6,387,457 | B1 | 5/2002 | Jiang et al. |
| 6,394,595 | B1 | 5/2002 | Jiang et al. |
| 6,402,317 | B2 | 6/2002 | Yanagawa et al. |
| 6,422,696 | B1 | 7/2002 | Takahashi et al. |
| 6,439,713 | B1 | 8/2002 | Noguchi et al. |
| 6,465,046 | B1 | 10/2002 | Hansson et al. |
| 6,579,616 | B1 | 6/2003 | Beckman et al. |
| 7,357,959 | B2 | 4/2008 | Bauer |
| 7,383,768 | B2 | 6/2008 | Reichwein et al. |
| 7,632,561 | B2 | 12/2009 | Thiers |
| 7,691,451 | B2 | 4/2010 | Ohkoshi et al. |
| 7,891,799 | B2 | 2/2011 | Edwards et al. |
| 7,985,444 | B2 | 7/2011 | Quist et al. |
| 8,067,618 | B2 | 11/2011 | Lautensack et al. |
| 8,114,513 | B2 | 2/2012 | Rentschler et al. |
| 8,192,010 | B2 | 6/2012 | Edwards et al. |
| 8,273,659 | B2 | 9/2012 | Lennon et al. |
| 8,317,311 | B2 | 11/2012 | Edwards et al. |
| 8,337,947 | B2 | 12/2012 | Camorani |
| 8,361,597 | B2 | 1/2013 | Shiao et al. |
| 8,430,498 | B2 | 4/2013 | Edwards et al. |
| 8,431,054 | B2 | 4/2013 | Pervan et al. |
| 8,465,804 | B2 | 6/2013 | Provoost et al. |
| 8,663,747 | B2 | 3/2014 | Quist et al. |
| 8,740,367 | B2 | 6/2014 | Edwards et al. |
| 8,814,346 | B2 | 8/2014 | Edwards et al. |
| 9,079,212 | B2 | 7/2015 | Pervan et al. |
| 9,266,382 | B2 | 2/2016 | Schacht et al. |
| 9,352,499 | B2 | 5/2016 | Ziegler et al. |
| 9,371,456 | B2 | 6/2016 | Pervan et al. |
| 9,528,011 | B2 | 12/2016 | Pervan et al. |
| 9,630,404 | B2 | 4/2017 | Pervan et al. |
| 9,670,371 | B2 | 6/2017 | Pervan et al. |
| 9,738,095 | B2 | 8/2017 | Pervan et al. |
| 9,873,803 | B2 | 1/2018 | Pervan et al. |
| 10,016,786 | B2 | 7/2018 | Quist et al. |
| 10,029,484 | B2 | 7/2018 | Pervan et al. |
| 11,566,380 | B2 | 1/2023 | Pervan |
| 2001/0005542 | A1 | 6/2001 | Graab et al. |
| 2001/0022607 | A1 | 9/2001 | Takahashi et al. |
| 2002/0149137 | A1 | 10/2002 | Jang et al. |
| 2003/0054121 | A1 * | 3/2003 | Thiemann ................ G01B 1/00 428/34.1 |
| 2003/0072919 | A1 | 4/2003 | Watts et al. |
| 2003/0108718 | A1 | 6/2003 | Simon et al. |
| 2003/0167717 | A1 | 9/2003 | Garcia |
| 2004/0101619 | A1 | 5/2004 | Camorani |
| 2004/0142107 | A1 | 7/2004 | Eriksson et al. |
| 2004/0153204 | A1 | 8/2004 | Blanco |
| 2004/0177788 | A1 | 9/2004 | Rick et al. |
| 2004/0217186 | A1 | 11/2004 | Sachs et al. |
| 2004/0239003 | A1 | 12/2004 | Espe et al. |
| 2004/0266207 | A1 | 12/2004 | Sirringhauss et al. |
| 2005/0003099 | A1 | 1/2005 | Quist et al. |
| 2005/0013932 | A1 * | 1/2005 | Dennis ................. B41M 7/0045 427/195 |
| 2005/0128274 | A1 | 6/2005 | Matsushima et al. |
| 2005/0176321 | A1 | 8/2005 | Crette et al. |
| 2005/0249923 | A1 | 11/2005 | Reichwein et al. |
| 2006/0156672 | A1 | 7/2006 | Laurent et al. |
| 2006/0188670 | A1 | 8/2006 | Kojima et al. |
| 2006/0246266 | A1 | 11/2006 | Hall |
| 2006/0264544 | A1 | 11/2006 | Lustiger et al. |
| 2007/0049047 | A1 | 3/2007 | Fujimoto et al. |
| 2007/0076069 | A1 | 4/2007 | Edwards et al. |
| 2007/0091160 | A1 | 4/2007 | Kis et al. |
| 2007/0107344 | A1 | 5/2007 | Kornfalt et al. |
| 2007/0134825 | A1 | 6/2007 | Zou et al. |
| 2007/0193174 | A1 | 8/2007 | Vogel et al. |
| 2007/0209736 | A1 | 9/2007 | Deringor et al. |
| 2007/0224438 | A1 | 9/2007 | Van et al. |
| 2007/0240585 | A1 | 10/2007 | Vaish et al. |
| 2007/0283648 | A1 | 12/2007 | Chen |
| 2007/0299196 | A1 | 12/2007 | Ohkoshi et al. |
| 2008/0010924 | A1 | 1/2008 | Pietruczynik et al. |
| 2008/0081862 | A1 | 4/2008 | Lustiger et al. |
| 2008/0185092 | A1 | 8/2008 | Blenkhorn |
| 2008/0224332 | A1 | 9/2008 | Tam |
| 2008/0241472 | A1 | 10/2008 | Shiao et al. |
| 2008/0261003 | A1 | 10/2008 | Lewis et al. |
| 2009/0010682 | A1 | 1/2009 | Camorani |
| 2009/0031662 | A1 | 2/2009 | Chen et al. |
| 2009/0042346 | A1 | 2/2009 | Kugler |
| 2009/0047480 | A1 | 2/2009 | Juers et al. |
| 2009/0116966 | A1 | 5/2009 | Althoff et al. |
| 2009/0155612 | A1 * | 6/2009 | Pervan .................... B32B 21/14 428/326 |
| 2009/0169783 | A1 | 7/2009 | Rentschler et al. |
| 2009/0171101 | A1 | 7/2009 | Lautensack et al. |
| 2009/0232969 | A1 | 9/2009 | Hayton et al. |
| 2009/0252925 | A1 | 10/2009 | Provoost et al. |
| 2009/0283141 | A1 | 11/2009 | Bentzen et al. |
| 2010/0032011 | A1 | 2/2010 | Sauar |
| 2010/0192793 | A1 | 8/2010 | Verhaeghe |
| 2010/0196678 | A1 | 8/2010 | Vermeulen |
| 2010/0260969 | A1 | 10/2010 | Vermeulen et al. |
| 2010/0291327 | A1 | 11/2010 | Rentschler et al. |
| 2010/0300020 | A1 | 12/2010 | Vermeulen |
| 2010/0300030 | A1 | 12/2010 | Pervan et al. |
| 2011/0024938 | A1 | 2/2011 | Tripp et al. |
| 2011/0097506 | A1 | 4/2011 | Shah et al. |
| 2011/0129640 | A1 | 6/2011 | Beall et al. |

(56) References Cited

U.S. PATENT DOCUMENTS

| | | | |
|---|---|---|---|
| 2011/0141189 | A1 | 6/2011 | Edwards et al. |
| 2011/0167744 | A1 | 7/2011 | Whispell et al. |
| 2011/0169888 | A1 | 7/2011 | Edwards et al. |
| 2011/0171412 | A1 | 7/2011 | Doehring |
| 2011/0189471 | A1 | 8/2011 | Ziegler et al. |
| 2011/0237739 | A1 | 9/2011 | Tada et al. |
| 2011/0247748 | A1 | 10/2011 | Pervan et al. |
| 2011/0250404 | A1 | 10/2011 | Pervan et al. |
| 2011/0261464 | A1 | 10/2011 | Hoffman et al. |
| 2011/0262720 | A1 | 10/2011 | Riebel et al. |
| 2011/0268937 | A1 | 11/2011 | Schacht et al. |
| 2011/0315186 | A1 | 12/2011 | Gee et al. |
| 2012/0015107 | A1 | 1/2012 | Schacht et al. |
| 2012/0052250 | A1 | 3/2012 | Derosa et al. |
| 2012/0082798 | A1 | 4/2012 | Quist et al. |
| 2012/0105534 | A1 | 5/2012 | Boday et al. |
| 2012/0164780 | A1 | 6/2012 | Brunton |
| 2012/0176443 | A1 | 7/2012 | Robertson et al. |
| 2012/0196081 | A1 | 8/2012 | Gleich et al. |
| 2012/0244317 | A1 | 9/2012 | Edwards et al. |
| 2012/0264853 | A1 | 10/2012 | Ziegler et al. |
| 2013/0025216 | A1 | 1/2013 | Reichwein et al. |
| 2013/0043211 | A1 | 2/2013 | Vermeulen |
| 2013/0108873 | A1 | 5/2013 | Shiao et al. |
| 2013/0170218 | A1 | 7/2013 | Wolk et al. |
| 2013/0242016 | A1 | 9/2013 | Edwards et al. |
| 2014/0017452 | A1 | 1/2014 | Pervan et al. |
| 2014/0023832 | A1 | 1/2014 | Pervan et al. |
| 2014/0028772 | A1 | 1/2014 | Pervan |
| 2014/0196618 | A1 | 7/2014 | Pervan et al. |
| 2014/0198168 | A1 | 7/2014 | Pervan et al. |
| 2014/0198170 | A1 | 7/2014 | Pervan et al. |
| 2014/0199495 | A1 | 7/2014 | Pervan et al. |
| 2014/0199513 | A1 | 7/2014 | Pervan et al. |
| 2014/0199531 | A1 | 7/2014 | Pervan et al. |
| 2014/0210126 | A1 | 7/2014 | Quist et al. |
| 2014/0220318 | A1 | 8/2014 | Pervan |
| 2015/0030817 | A1 | 1/2015 | Wiegelmann et al. |
| 2015/0239230 | A1 | 8/2015 | Vermeulen |
| 2015/0274997 | A1 | 10/2015 | Pervan et al. |
| 2015/0298492 | A1 | 10/2015 | Palumbo |
| 2015/0328919 | A1 | 11/2015 | Vermeulen |
| 2016/0068010 | A9 | 3/2016 | Vermeulen |
| 2016/0114619 | A1 | 4/2016 | Schacht et al. |
| 2016/0144612 | A1 | 5/2016 | Pervan et al. |
| 2016/0208116 | A1 | 7/2016 | Pervan et al. |
| 2016/0250853 | A1 | 9/2016 | Pervan et al. |
| 2016/0368180 | A1 | 12/2016 | Ziegler et al. |
| 2017/0066255 | A1 | 3/2017 | Pervan et al. |
| 2017/0204281 | A1 | 7/2017 | Pervan et al. |
| 2017/0232761 | A1 | 8/2017 | Pervan et al. |
| 2017/0348984 | A1 | 12/2017 | Pervan et al. |
| 2018/0111390 | A1 | 4/2018 | Pervan et al. |
| 2018/0127605 | A1 | 5/2018 | Pervan et al. |
| 2018/0171637 | A1 | 6/2018 | Shiao et al. |
| 2018/0298216 | A1 | 10/2018 | Pervan et al. |

FOREIGN PATENT DOCUMENTS

| | | | |
|---|---|---|---|
| CN | 101407089 | A | 4/2009 |
| CN | 101513812 | A | 8/2009 |
| DE | 2334734 | B1 | 6/1974 |
| DE | 3249919 | C2 | 7/1991 |
| DE | 202004018710 | U1 | 3/2005 |
| DE | 102007019871 | A1 | 10/2008 |
| EP | 0403264 | A2 | 12/1990 |
| EP | 0657309 | A1 | 6/1995 |
| EP | 0769535 | A2 | 4/1997 |
| EP | 1020303 | A1 | 7/2000 |
| EP | 1020765 | A1 | 7/2000 |
| EP | 1207051 | A2 | 5/2002 |
| EP | 1209199 | A1 | 5/2002 |
| EP | 1584378 | A1 | 10/2005 |
| EP | 2108524 | A1 | 10/2009 |
| EP | 2110267 | A2 | 10/2009 |
| EP | 2213476 | A1 | 8/2010 |
| EP | 2363288 | A1 | 9/2011 |
| EP | 2363299 | A1 | 9/2011 |
| EP | 2542426 | A1 | 1/2013 |
| GB | 1215551 | A | 12/1970 |
| GB | 2065556 | A | 7/1981 |
| GB | 2128898 | A | 5/1984 |
| GB | 2205768 | A | 12/1988 |
| GB | 2419110 | A | 4/2006 |
| IT | 1187208 | B | 12/1987 |
| JP | 2001-311254 | A | 11/2001 |
| JP | 2005-097339 | A | 4/2005 |
| JP | 2008-156573 | A | 7/2008 |
| JP | 2008-265229 | A | 11/2008 |
| JP | 2009-173003 | A | 8/2009 |
| JP | 2010-209325 | A | 9/2010 |
| JP | 6287467 | B2 | 3/2018 |
| KR | 10-2009-0112326 | A | 10/2009 |
| RU | 2356639 | C2 | 5/2009 |
| WO | 90/15673 | A1 | 12/1990 |
| WO | 9429115 | A1 | 12/1994 |
| WO | 95/15266 | A1 | 6/1995 |
| WO | 98/45129 | A1 | 10/1998 |
| WO | 01/72489 | A2 | 10/2001 |
| WO | 02/42373 | A1 | 5/2002 |
| WO | 03/57488 | A1 | 7/2003 |
| WO | 2005/097874 | A2 | 10/2005 |
| WO | 2005/120847 | A1 | 12/2005 |
| WO | 2006051238 | A1 | 5/2006 |
| WO | 2006/057241 | A1 | 6/2006 |
| WO | 2006/125036 | A2 | 11/2006 |
| WO | 2007/033031 | A2 | 3/2007 |
| WO | 2007/060298 | A1 | 5/2007 |
| WO | 2007/096746 | A2 | 8/2007 |
| WO | 2007/125096 | A1 | 11/2007 |
| WO | 2007/125098 | A1 | 11/2007 |
| WO | 2008/042088 | A1 | 4/2008 |
| WO | 2008/121749 | A1 | 10/2008 |
| WO | 2009/030935 | A2 | 3/2009 |
| WO | 2009/065769 | A2 | 5/2009 |
| WO | 2009/074174 | A1 | 6/2009 |
| WO | 2010/070485 | A2 | 6/2010 |
| WO | 2010/147512 | A2 | 12/2010 |
| WO | 2011/064075 | A2 | 6/2011 |
| WO | 2011/107610 | A1 | 9/2011 |
| WO | 2011/129757 | A1 | 10/2011 |
| WO | 2012/007230 | A1 | 1/2012 |
| WO | 2012/141651 | A1 | 10/2012 |
| WO | 2014/037823 | A1 | 3/2014 |

OTHER PUBLICATIONS

Canadian Office Action dated Sep. 25, 2018, for corresponding Canadian Patent Application No. 2984272, filed Sep. 9, 2011.
Canadian Office Action for Canadian patent application No. 2,791,216, dated Dec. 15, 2016.
European Search Report and the Written Opinion of the European Patent Office Patent Office in counterpart foreign application No. 10155673.6 filed Mar. 5, 2010.
Hudd, "Chapter 1: Inkjet Printing Technologies," Chemistry of Inkjet Inks, 2010, pp. 3-18, World Scientific Publishing Co, PTE. Ltd., Published in Singapore and Hackensack NJ.
International Search Report issued in PCT/SE2014/050022, dated May 26, 2014.
Odian, George, "Principles of Polymerization" 1991, 3rd Edition, 5 pages incl. pp. 122-123, John Wiley & Sons, Inc. New York, NY.
Owens, James C. "A Tutorial on Printing," Imaging.org Resources, 2010 pp. 1-5, Society for Imaging Sciences and Technology, retrieved Jul. 27, 2015 from http://web.archive.org/web/20100706153535/http://www.imaging.org/ist/resources/tutorial.
Pervan, Darko, Technical Disclosure entitled "Digital Overlay" IP.com No. IPCOM000225271, IP.com PriorArtDatabase, Feb. 5, 2013.
Pervan, Darko, Technical Disclosure entitled "Digital Printing and Embossing" IP.com No. IPCOM000224950D, IP.com PriorArtDatabase, Jan. 15, 2013.

(56) References Cited

OTHER PUBLICATIONS

International Search Report for Corresponding International Application No. PCT/EP2011/053383, dated May 26, 2011.

* cited by examiner

METHOD FOR MANUFACTURING A FLOOR BOARD

CROSS-REFERENCE TO RELATED APPLICATION

This application is a continuation and claims priority under 35 USC 120 of U.S. application Ser. No. 17/678,838, filed Feb. 23, 2022, which is a continuation of Ser. No. 16/356,750, filed Mar. 18, 2019, now U.S. Pat. No. 11,292,289 issued Apr. 5, 2022, which is a continuation of U.S. application Ser. No. 14/678,653 filed Apr. 3, 2015, now U.S. Pat. No. 10,239,346, issued Mar. 26, 2019, which is a continuation of of U.S. application Ser. No. 13/581,738 filed Aug. 29, 2012, which is a Section 371 National Stage Application of International Application PCT/EP2011/053383 filed Mar. 7, 2011, and published as WO/2011/107610 A1 in English, all of which are incorporated herein in their entirety.

BACKGROUND

The discussion below is merely provided for general background information and is not intended to be used as an aid in determining the scope of the claimed subject matter.

Aspects of the invention relate to a method of manufacturing a floor board.

In the field of the flooring industry, like in several other industries, there is a trend to mass customization. This means that there is a demand for products that suit to specific customers. As a consequence, a high degree of flexibility in production processes is required.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

A method of manufacturing a floor panel according to an aspect of the invention, which comprises supplying a panel, printing a curable substance or surface removing substance onto the panel in a predefined pattern for creating an elevation on the panel at the pattern or removing a portion of the surface of the panel at the pattern, respectively, and curing the curable substance or removing any reaction products of the surface removing substance and the panel, hence forming the floor board.

Due to the method it is not necessary to use relatively expensive embossed press plates or press rollers to be pressed under high pressure on the panel in order to create an embossed surface of the floor board. Furthermore, the method provides the opportunity to create a high degree of variations in relief patterns of floor boards. A comparable degree of variation in case of using different embossed press plates or press rollers would be more expensive.

In an embodiment the step of printing is digitally controlled and/or non-contact printing and/or non-contact printing. Due to the digitally controlled step a quick switch to manufacturing floor boards having alternative relief patterns can be effected. This introduces a great flexibility in relief patterns and avoids the necessity of repetitive embossment such as in case of prior art relief press rollers or relief press plates. This means that a standardized basic product can be efficiently further treated to form a unique product corresponding to individual customer desires. More specifically, it is possible that the substance is printed onto the panel via a digitally controlled printing nozzle.

Nevertheless, it is also conceivable to print the curable substance or surface removing substance onto the panel through roller printing or an alternative prior art printing method. In order to change the pattern to be printed a plurality of printing rollers having different patterns can be used. For example, they may be revolver-mounted in order to be able to quickly change to a different pattern to be printed onto the panel.

The panel may comprise a substrate of HDF, WPC (Wood Plastic Composite), polymeric composite (engineered polymer), PVC, LVT (Luxury Vinyl Tile) or the like. The panel may be provided with a decorative basic pattern, which is directly printed on the substrate or laminated thereon by means of a known method of laminating. Furthermore, the supplied panel may already comprise an embossment, but may also have a flat surface on which the curable substance or the surface removing substance is printed. The curable substance may be cured by curing means, for example by means of UV radiation or a UV laser. Alternative curing means may comprise electron-beam heating, or normal heating at elevated temperature; for example, the entire panel including the curable substance may be placed in a heated environment so as to cure the substance.

The curable substance may comprise wear resistant particles in order to provide good wear performance of the elevated portions of the floor board in use.

In a specific embodiment the predefined pattern substantially corresponds to a decorative basic pattern being present on the panel. This means that the floor board will be provided with embossment in register. In practice, the pattern may be a wood grain pattern where the wood grains are depressed portions and the surrounding portions are elevated portions. The depressed portions can be made by printing a surface removing substance at the intended depressed portions or printing a curable substance beside of the intended depressed portions.

The curable substance or surface removing substance may be printed onto the panel by first printing a liquid onto the panel in said predefined pattern, and then providing an intermediate substance to the liquid, wherein the intermediate substance or the liquid together with the intermediate substance form the curable substance or surface removing substance. In practice, the intermediate substance may comprise a powder. This can be applied onto the liquid and stick to the liquid, whereas abundant powder is removed, for example by a suction device. In one embodiment, the intermediate substance contains wear resistant particles since this provides the opportunity to print the liquid without wear resistant particles onto the panel so as to avoid wear of a printing head, whereas the powder including wear resistant particles can be applied less accurate to the printed liquid.

In practice the maximal thickness of the curable substance lies between 50 and 250 .mu.m, but a thinner or thicker layer is conceivable. Preferably, the maximal thickness lies between 5 and 1000 .mu.m.

The curable substance may contain a varnish, which is lustrous or matte, for example.

It is also possible that the panel is a flexible sheet which is laminated to a substrate after printing the curable substance or surface removing substance thereon so as to form the floor board. For example, the sheet is a paper sheet which is already provided with a resin or still has to be provided with a resin.

In an alternative embodiment the method comprises the steps of supplying a panel, applying a curable substance or surface removing substance onto the panel in a predefined pattern for creating an elevation on the panel at the pattern or removing a portion of the surface of the panel at the pattern, respectively, wherein the substance is applied onto the panel by first putting a layer of the substance onto the panel and then creating the predefined pattern by a digitally controlled impacting member which is pressed into said substance and movable in a plane extending parallel to the panel so as to form the pattern, curing the curable substance or removing any reaction products of the surface removing substance and the panel, hence forming the floor board. The advantage of the method is that using expensive prior art embossed press plates is not necessary to create embossed floor boards, whereas quick changes to the desired relief pattern can be achieved.

In practice the impacting member will be smaller than the dimensions of the panel. The impacting member may be comparable to a conventional dot matrix printer, in which digitally controlled pins impact on a paper via an ink ribbon. This method is applicable in case of partly cured top layers, such as polyurethane (PU) hot coating top layers. The control of the impacting member can be based on image recognition, for example cameras that recognize the pattern of approaching panels.

BRIEF DESCRIPTION OF THE DRAWINGS

Aspects of the invention will be explained in more detail hereinafter with reference to drawings, which are very schematic representations of embodiments of the invention.

DETAILED DESCRIPTION OF THE ILLUSTRATIVE EMBODIMENT

Figure 1:
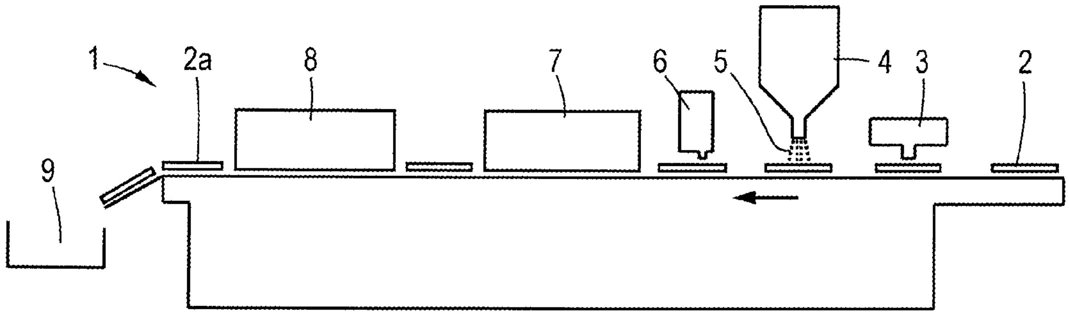
FIG. 1 is a schematic side view of an apparatus for performing an embodiment of the method.

FIG. 1 illustrates the main steps of an embodiment of the method. The manufacturing process performed by an apparatus 1 runs from the right to the left in FIG. 1. In this case a panel 2 is transported first to a digital printing station 3. At the digital printing station 3 a liquid is printed on an upper surface of the panel 2 in a predetermined pattern. The liquid may be an ink or varnish, being transparent or colored or any other liquid material.

Then, the printed panel 2 is transported to a powder unit 4, where an intermediate substance or a powder 5 is spread over the panel 2. The powder 5 will stick to the liquid. The liquid and the powder 5 form a substance which is curable. A part of the powder 5 may fall beside of the printed pattern or on a portion of the printed pattern which is already dry. That part of the powder 5 will be removed from the panel 2 by a suction device 6, but an alternative powder removing device is conceivable.

In a subsequent step the formed substance on the panel 2 is cured at a heating station 7. Before storing the resulting floor boards 2*a* at a storage station 9 the panels 2 may be cooled at a cooling station 8. In the heating station 7 the powder may be melted together into a single mass which is elevated above the initial upper surface of the panel 2. It is conceivable that the liquid and powder together form a curable substance or the powder itself forms a curable substance adhering to the panel 2 upon curing.

It is also conceivable that the powder forms the curable substance whereas the liquid pattern only functions as a temporary carrier for carrying the powder in the desired pattern. In this case the liquid may partly or fully disappear during the step of heating, for example by evaporation.

The powder 5 may be a swelling powder such that upon curing the volume of the substance becomes larger (and the elevations higher) than that of the sum of the liquid and the powder 5 separately. In practice, the maximal thickness of the substance after curing lies between 50 and 250 .mu.m, but a higher or lower thickness is conceivable. In practice, a thickness of 5-1000 .mu.m is preferred.

Furthermore, the powder 5 can also contain wear-resistant particles, for example corundum particles. It is advantageous that in the embodiment as illustrated in FIG. 1 the wear resistant particles are supplied separately from a printing head of the digital printing station, thus avoiding wear of the printing head through the presence of wear resistant particles.

Due to curing of the mixture of the liquid and the powder 5 or the powder 5 alone a solid elevated region arises on the panel 2 at the location where the liquid pattern was printed. The pattern may represent a real wood pattern or the like. The heating station 7 may comprise a UV-laser, for example, but alternative curing means are conceivable.

The apparatus of FIG. 1 may comprise a camera (not shown) for recognizing a basic pattern being printed on the panel 2 before arriving at the digital printing station 3. The pattern to be printed on the panel 2 at the digital printing station 3 may correspond to the basic pattern such that the panel 2 obtains an embossment in register.

Several types, shapes and dimensions of the powder 5 are conceivable. For example, metallic resin powder which creates a metallic effect after melting, lustrous resin powder in which lustrous particle are added to the powder, anti-static powder which avoids build-up of electrostatic charge, and powders which generate pearlescent effect, matt effect, or odour effect.

Figure 2:
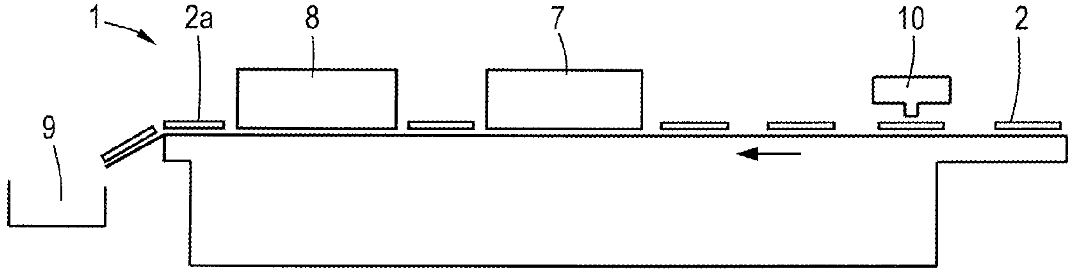
FIG. 2 is a similar view as FIG. 1 of an alternative embodiment.

In an alternative embodiment the curable substance is directly printed at the printing station 10 in a predetermined pattern on a panel 2. This is illustrated in FIG. 2. In this case, a relatively large amount of substance has to be printed by the printing station 10. Other features as described in relation to the embodiment as illustrated in FIG. 1 are also applicable to the embodiment as illustrated in FIG. 2.

Figure 3:
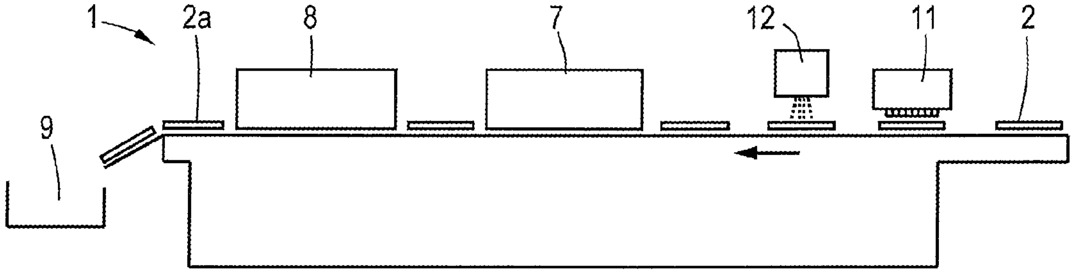
FIG. 3 is a similar view as FIG. 1 of another alternative embodiment.

In a further alternative embodiment of the method a layer of the substance is spread onto the panel 2 at a substance spread device 11 and then the predetermined relief pattern is created by a digitally controlled impacting member 12, see FIG. 3. In this case the substance may be spread uniformly over the panel 2. The digitally controlled impacting member 12 is repeatably pressed into the curable substance and movable in a plane extending parallel to the panel 2 so as to form the relief pattern. Other features as described in relation to the embodiment as illustrated in FIG. 1 are also applicable to the embodiment as illustrated in FIG. 3.

Instead of locally displacing the substance by an impacting member 12 it is also conceivable to remove the substance locally from the panel, for example by a suction device.

In another alternative method a surface removing substance can be applied on the panel (directly or indirectly via powder in a printed liquid as described hereinbefore) such that the local surface of the panel 2 at the intended pattern is removed. The substance can be applied on the panel in a manner as illustrated in FIGS. 1 and 2. The substance is selected such that it reacts with the surface of the panel 2 so as to remove a portion thereof. Contrary to the embodiments as described above the relief pattern of the panel 2 is formed by removing material from the panel 2 instead of adding material. After heating and/or cooling of the substrate on the panel any reaction products may be removed by pressed air, for example. It is also possible that neither heating nor cooling is necessary in this embodiment. After applying the embossment in this way the panel may be covered with a finishing layer containing wear resistant particles.

Alternatively, the surface removing substance is selected such that it reacts with the surface of the panel 2 after being activated. For example, the substance can be activated by a heat source, UV radiation, a laser beam or the like. When the surface removing substance is printed in a predefined pattern onto the panel 2, an activation device needs not to be focused very accurately on specific areas of the panel surface since only those areas will be activated where the substance is present. After activation and reaction of the substance with the panel surface, any reaction products may be removed.

Panels having the same decorative basic pattern may be provided with different relief patterns, for example one of the type embossing-in-register and the other one of the type brushed all-over. This enlarges the variation of appearances of floor boards.

The panel 2 on which the curable substance or surface removing surface is applied, may be made of HDF, WPC, polymer composite or engineered polymer, LVT, PVC or the like. It is noted that the method can also be applied on a flexible sheet which will be laminated to a substrate at a later stage so as to form a floor board.

The invention is not limited to the embodiments shown in the figures, which can be varied in several ways within the scope of the invention. It is for example possible that the method is applied on alternative substrates than on a panel or a sheet, for example on the packaging material of floor panels. Furthermore, the digital printing station may be replaced by alternative printing means, for example a conventional printing roller as known from the prior art roller printing process.

The invention claimed is:

1. A method of manufacturing a floor board, comprising the steps of:

supplying a panel, printing a substance onto the panel in a predefined pattern for creating an elevation on the panel at the predefined pattern, wherein said substance comprises a liquid and a powder, the substance is printed onto the panel by printing the liquid onto an initial upper surface of the panel in said predefined pattern, and then providing the powder to the liquid, heating the powder so that the powder is melted together into a single mass which is elevated above the initial upper surface of the panel, hence forming the floor board;

wherein the liquid evaporates during the step of heating the powder.

2. A method according to claim 1, wherein the step of printing is digitally controlled.

3. The method according to claim 1, wherein a maximal thickness of the substance lies between 20 and 250 μm above the initial upper surface of the panel.

4. The method according to claim 1, wherein the maximal thickness of the substance lies between 5 and 1000 μm above the initial upper surface of the panel.

5. The method according to claim 1, wherein a first portion of the powder sticks to the liquid whereas a second portion of the powder not sticking to the liquid is removed.

6. The method according to claim 5, wherein the abundant powder is removed by suction.

7. The method according to claim 1, wherein the panel comprises a decorative pattern prior to the printing of the substance to the panel.

8. The method according to claim 7, wherein the decorative pattern is directly printed on the panel.

9. The method according to claim 1, wherein the panel comprises an embossment prior to the printing of the substance to the panel.

10. The method according to claim 1, wherein the panel comprises a flat surface.

11. The method according to claim 1, wherein the liquid is transparent or colored.

12. The method according to claim 1, wherein in said heating step an entirety of the panel including the substance is placed in a heated environment.

13. The method according to claim 12, wherein after heating said panels are cooled before storing.

14. The method according to claim 1, wherein the powder comprises wear resistant particles.

15. The method according to claim 1, wherein the predefined pattern substantially corresponds to a decorative pattern present on the panel prior to printing of the substance.

16. The method according to claim 1, wherein the substance is printed beside a predetermined portion of the predefined pattern to form a depressed portion.

17. A method of manufacturing a floor board, comprising the steps of:

supplying a panel, printing a substance onto the panel in a predefined pattern for creating an elevation on the panel at the predefined pattern, wherein said substance comprises a liquid and a powder, the substance is printed onto the panel by printing the liquid onto an initial upper surface of the panel in said predefined pattern, and then providing the powder to the liquid, heating the powder so that the powder is melted together into a single mass which is elevated above the initial upper surface of the panel, hence forming the floor board;

wherein the predefined pattern substantially corresponds to a decorative pattern present on the panel prior to printing of the substance;

wherein a camera recognizes the decorative pattern printed on the panel before arriving at a printing station for printing the substance.

* * * * *